United States Patent [19]

Miller

[11] Patent Number: 4,679,578

[45] Date of Patent: Jul. 14, 1987

[54] VEHICLE CLEANING SYSTEM INCORPORATING NOVEL NOZZLE APPARATUS

[76] Inventor: Richard M. Miller, 2442 Harvest Dr., Conyers, Ga. 30208

[21] Appl. No.: 788,098

[22] Filed: Oct. 16, 1985

Related U.S. Application Data

[63] Continuation-in-part of Ser. No. 594,934, Mar. 29, 1984, abandoned.

[51] Int. Cl.$^4$ ............................................. B60S 3/04
[52] U.S. Cl. .................................. 134/123; 134/179; 239/227; 239/229; 239/243
[58] Field of Search .................. 134/45, 123, 172, 179; 239/227, 229, 243

[56] References Cited

U.S. PATENT DOCUMENTS

| | | | |
|---|---|---|---|
| 2,574,206 | 11/1951 | Browning | 239/227 X |
| 3,237,389 | 3/1966 | Green | 239/229 X |
| 3,259,138 | 7/1966 | Heinicke | 134/123 |
| 3,391,701 | 7/1968 | Richardson et al. | 134/123 |

FOREIGN PATENT DOCUMENTS

| | | | |
|---|---|---|---|
| 473972 | 5/1951 | Canada | 239/227 |
| 2745551 | 4/1978 | Fed. Rep. of Germany | 134/45 |
| 686716 | 1/1953 | United Kingdom | 134/123 |

OTHER PUBLICATIONS

*Revers-O-Matic* brochure, p. 1968.

*Primary Examiner*—Philip R. Coe
*Attorney, Agent, or Firm*—Arnold, White & Durkee

[57] ABSTRACT

In the preferred and illustrated embodiment set forth herein, a tuned nozzle cleaning system is disclosed for a variety of vehicles. The vehicle cleaning system incorporates upstanding frame members positioned to the left and the right of a vehicle driven along a guided path. The frame supports in a pivoting, sliding, bushing an elongate oscillatory header rod. The header rod is connected at its opposite end to the throw of an eccentric mechanism which imparts rotation to that end of the header rod, thereby moving in reciprocating fashion to describe a regular pattern of movement. The header rod is preferably hollow, conducting water along its length. Water is delivered from a high pressure pump with suitable detergents and is pumped to various spray nozzles along the rod.

This system incorporates a water spray nozzle having a novel construction. Each nozzle is supported by a tee so that water flows through the tee and into a short tube made of resilient material. The stiffness of the tube, the length of the tube, the excitation weight on the end of the tube, the pressure of the water, and the size and placement of the orifice at the end of the tube determine the sweeping spray pattern of the tuned cleaning nozzle. When the header is oscillated, the tuned cleaning nozzles, as a function of these factors, oscillate and synchronously sweep out a controlled spray pattern. Several sets of nozzles are incorporated to distribute water under pressure for cleaning over a specified area. The frame can optionally be extended to include overhead and bottom located nozzles for cleaning of the vehicle on all sides.

16 Claims, 19 Drawing Figures

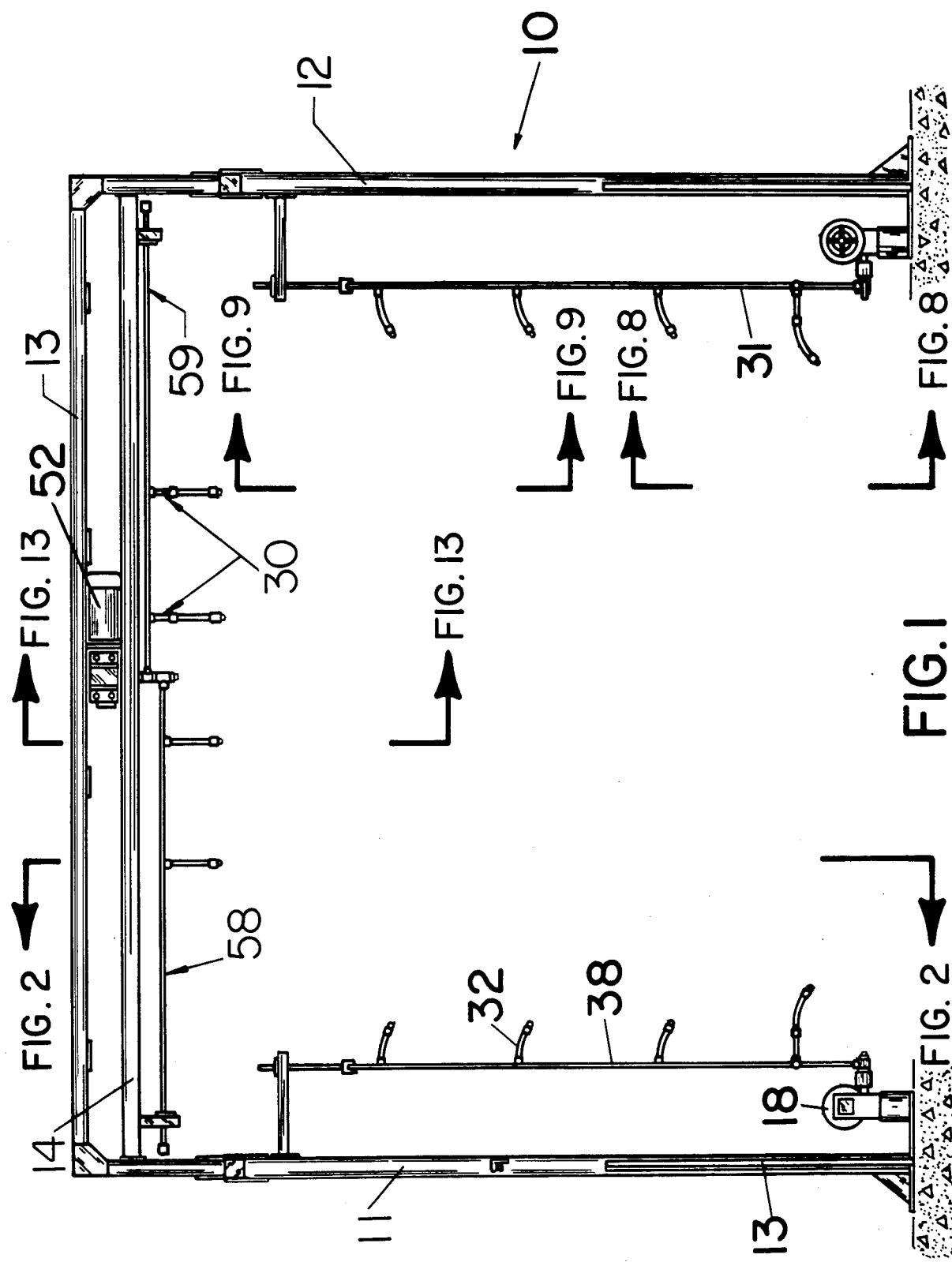

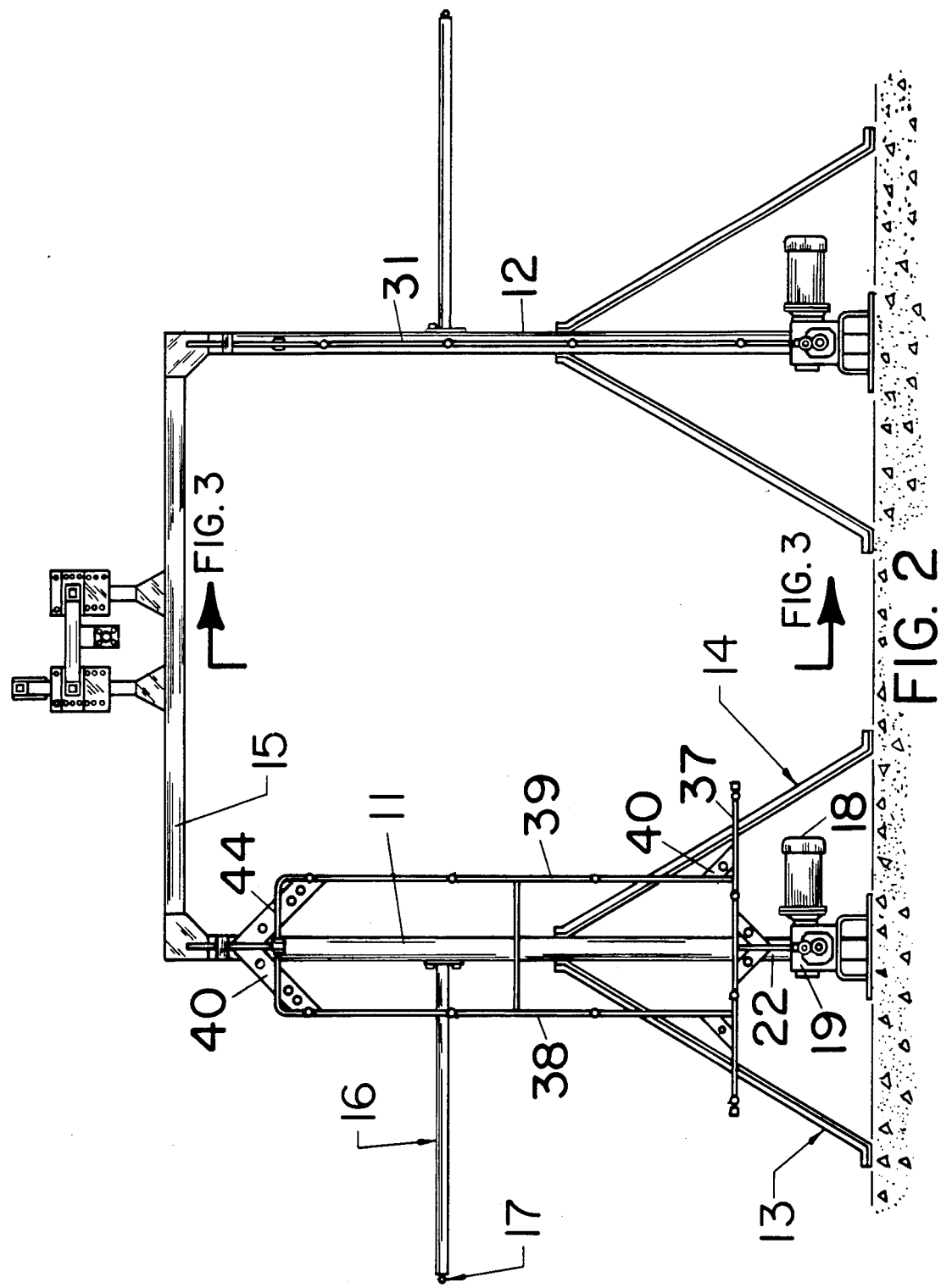

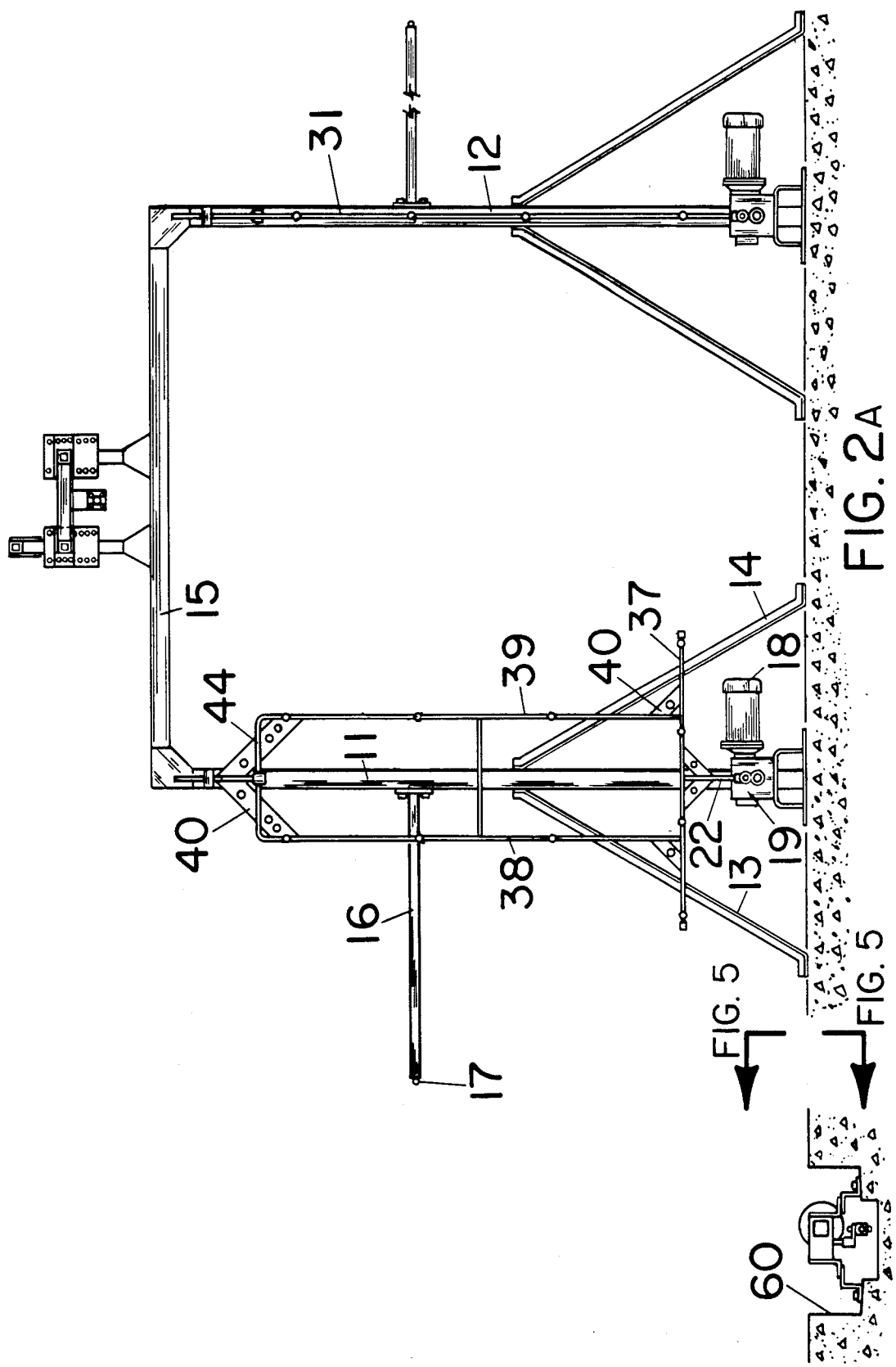

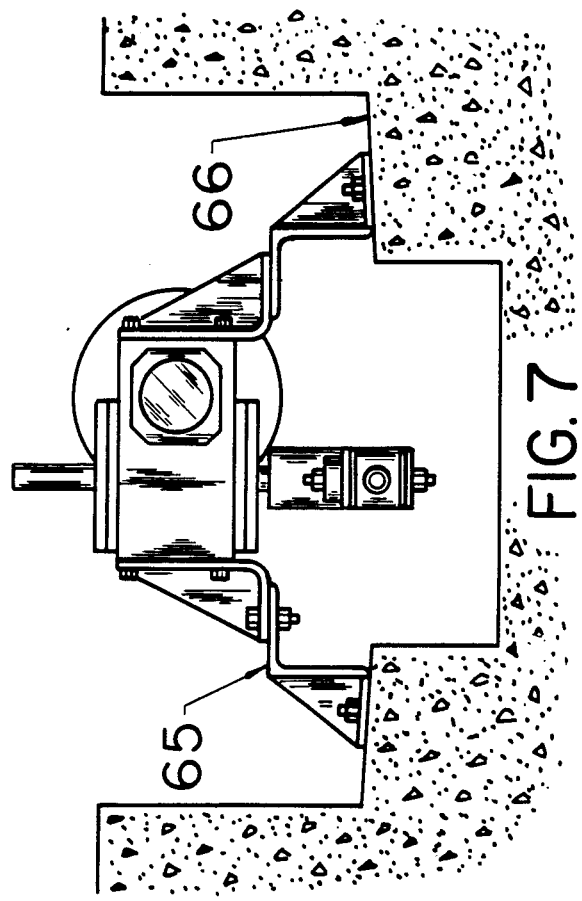
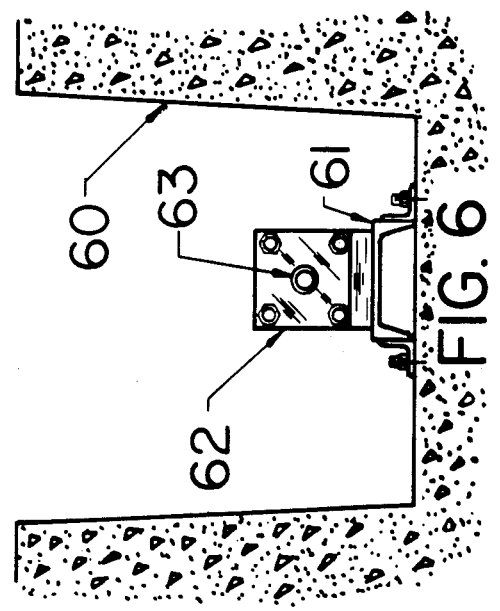
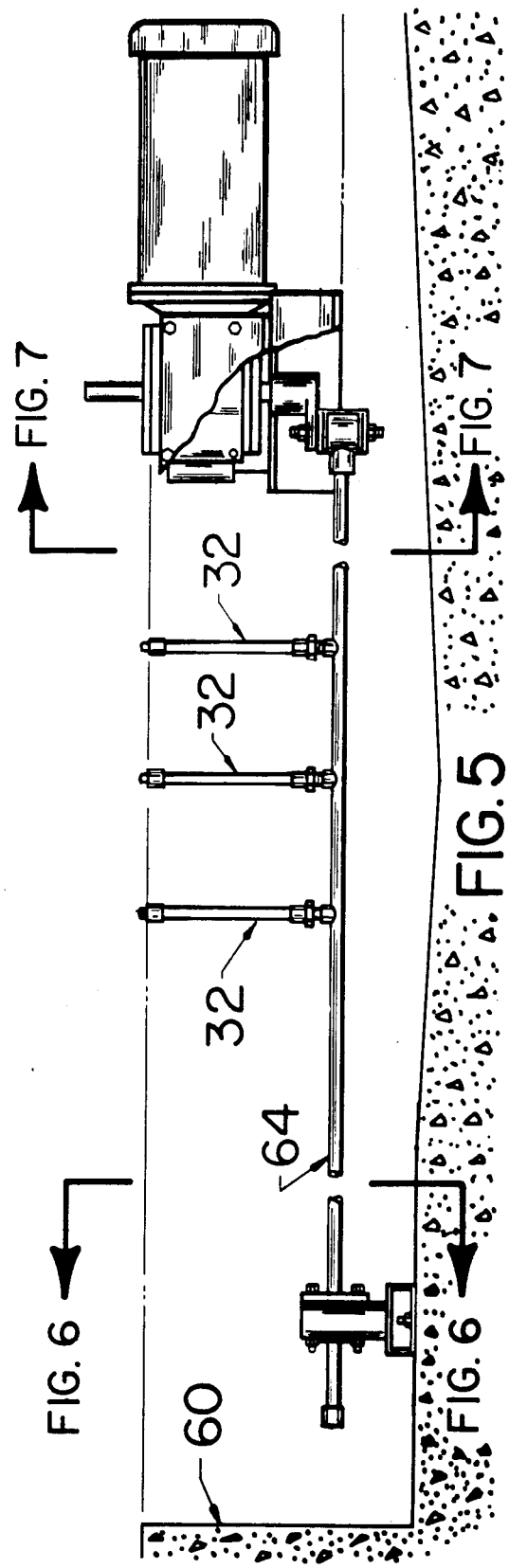

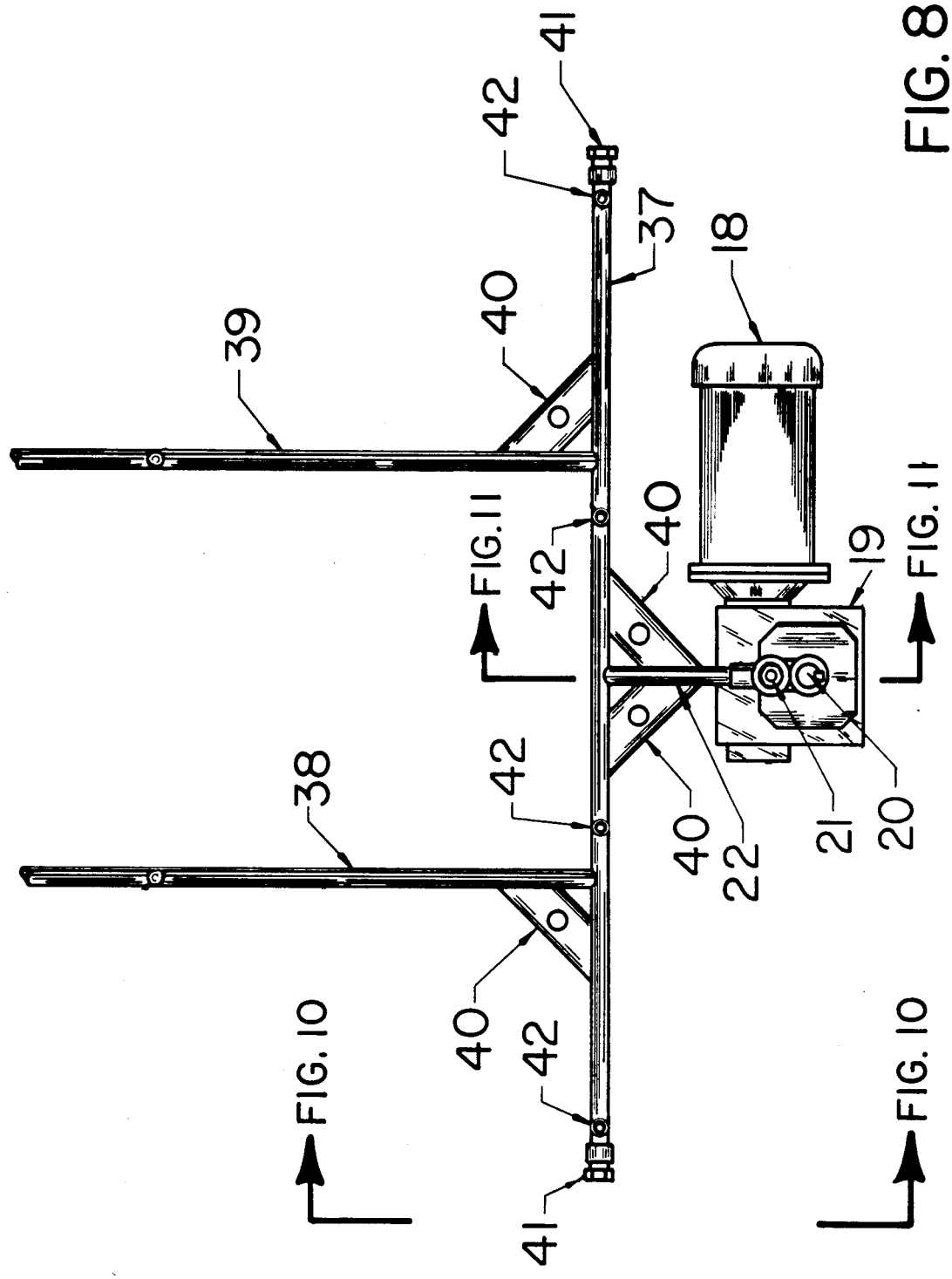

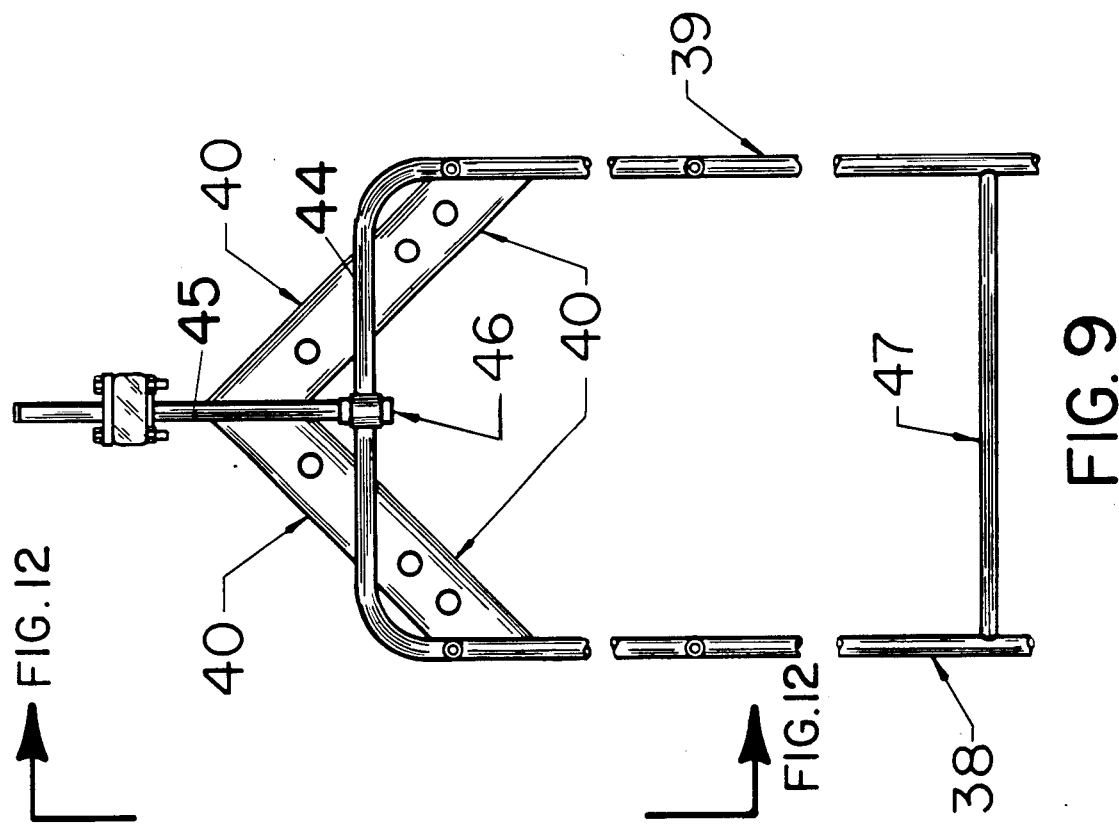
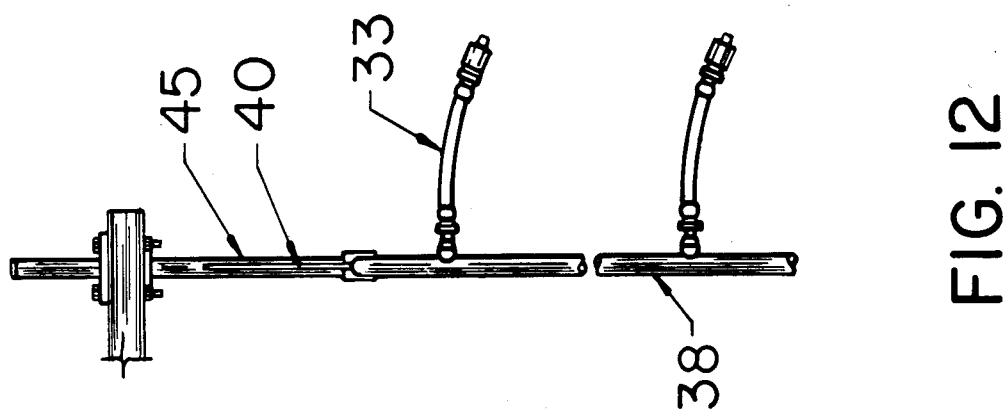

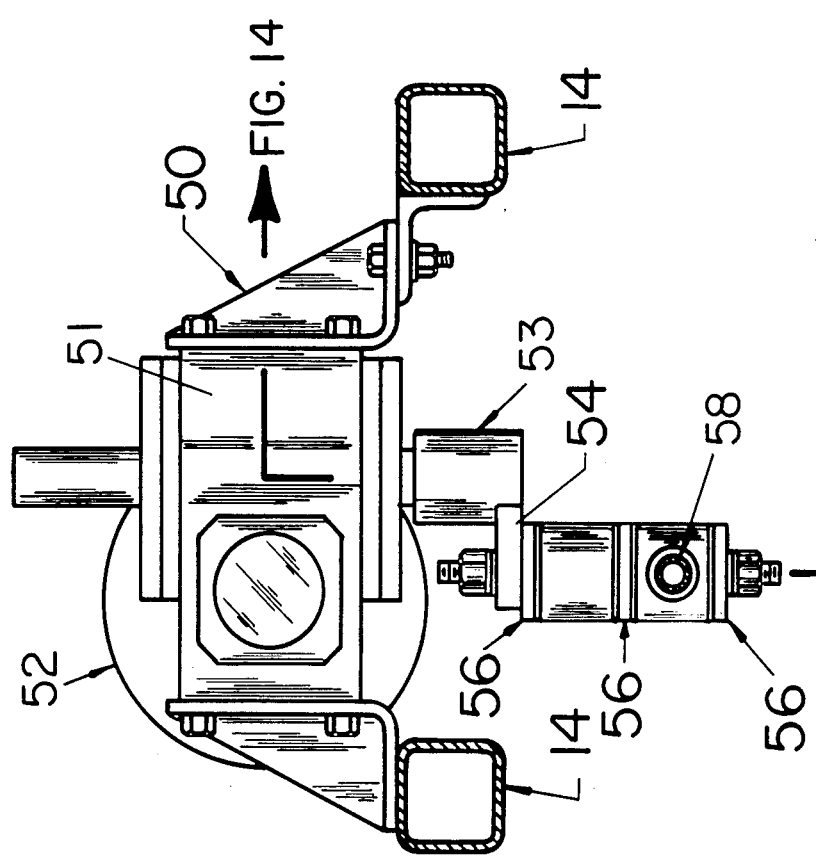
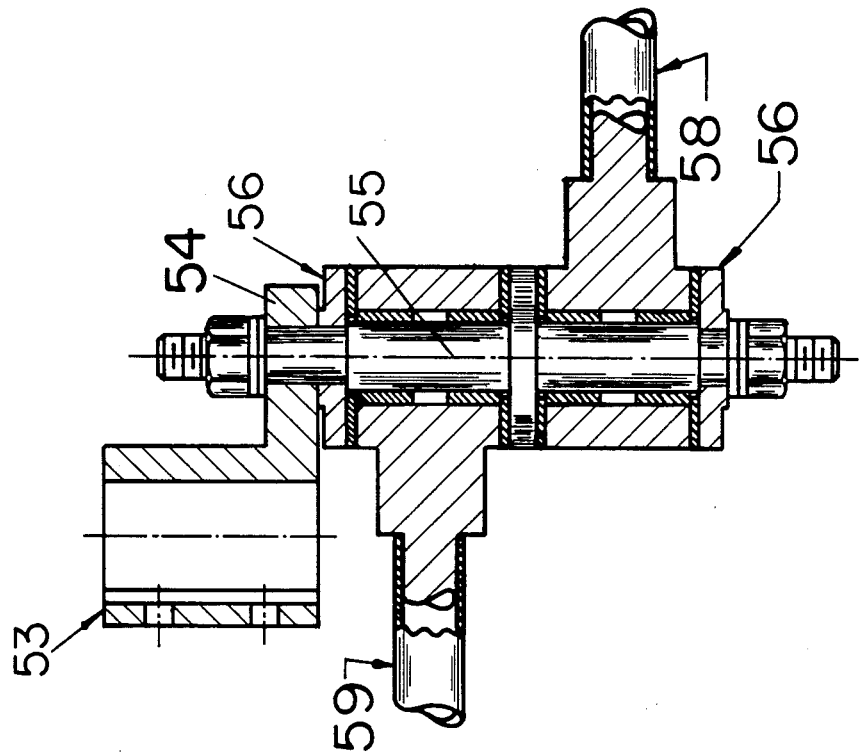
FIG. 13
FIG. 14

VEHICLE CLEANING SYSTEM INCORPORATING NOVEL NOZZLE APPARATUS

This is a continuation-in-part of copending application Ser. No. 594,934 filed on 3/29/84, and now abandoned.

BACKGROUND OF THE DISCLOSURE

This disclosure sets forth a vehicle cleaning system in general and in particular features a nozzle suited for use in many industrial applications. One suitable application is for the cleaning of transit system vehicles such as buses. Other vehicles which can be cleaned with this apparatus include trucks, trailers, rail cars, subway cars and the like. It can be used for large or small vehicles exposed to dirt, grease and other materials comprising road grime or which otherwise accumulates on the vehicle. This apparatus is especially able to clean such vehicles by applying over the surface a distributed, set pattern for cleaning. For instance, consider the situation in cleaning a bus. Typically, a bus has a very large side wall which might be 60 feet in length and which might stand 11 feet tall. The apparatus of this disclosure accomplishes cleaning of the front, rear, sides, top and bottom of such a vehicle without rotating brushes and the like. The accumulation of road grime is typically concentrated on the lower portions of the vehicle. Also, in regions where it is necessary, salt is used to clear ice from the roadway and salt may accumulate with the grime. The salt will cause corrosive damage to the vehicle if left on the vehicle. Accordingly, it also must be removed by cleaning.

This apparatus accomplishes cleaning of regular or irregular surfaces with an extended range of high pressure water impinging on the vehicle at a narrow angle with high volume flow. The high pressure, high volume spray from the nozzles controllably sweeps over an area with an angular spray pattern to clean across a determined height. The vehicle is moved slowly in front of the nozzle which sweeps along the vehicle, cleaning a "strip" of the vehicle. Nozzle motion cleans the strip as the nozzle oscillates in a tuned fashion. This apparatus applies a set of overlapping water spray patterns to the vehicle for cleaning. It typically uses a water based solution applied in a high volume, high pressure impingement spray. The water is delivered with a suitable chemical mixture, and duplicate sets of equipment can be used to thereby attain a first application capable of spraying hot water with a detergent culminating in a last application of water which is rinse water at a reduced temperature. Notwithstanding the multitude of nozzles used in a typical installation, the consumption of water is relatively low because each nozzle cleans a relatively narrow angle surface on the vehicle in a few seconds, flowing water through small orifii thereby enabling maximum cleaning with a minimum quantity of water. Because there are no rotating brushes, the moving equipment in the apparatus is relatively minimal and the equipment which encounters wear and tear is significantly reduced.

With this in view, the apparatus of this disclosure is therefore summarized as a cleaning apparatus intended for use to clean a large variety of objects with irregular surfaces. The vehicle cleaning apparatus is positioned adjacent to the driving path of a vehicle to be cleaned, the frame supporting a rod shaped, water delivery manifold having many nozzles. The header rod is located in position by the frame to locate several nozzles for applying overlapping oscillatory spray patterns to the vehicle. One end of the header rod passes through a pivotally mounted, sliding bushing to enable the header rod to reciprocate at the urging of an eccentric throw mechanism at the opposite end of the rod. A circular stroke is applied to the rod at the lower end of the rod where the eccentric is preferably located low relative to the vehicle because the accumulation of road grime and film is typically much worse at the bottom of the vehicle. The header rod is a water supply manifold supporting a number of nozzles. The nozzles are preferably identically constructed and differ primarily in the oscillatory pattern of movement which they undertake during operation. The nozzles are constructed of a tubular hose constructed of resilient material and terminating in a weighted tip. The tip is weighted as one factor in tip control. The tuned nozzle construction and excitation determine the pattern of spray.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a front view of a frame supporting nozzles for cleaning on both sides and across the top of a vehicle which is driven through the frame of FIG. 1;

FIG. 2 is an orthogonal view taken along the Line 2—2 of FIG. 1 illustrating at the left a duplex header rod construction operated by a single eccentric throw mechanism and showing at the right a single header rod construction supporting a plurality of nozzles thereon;

FIG. 2a is a view similar to FIG. 2 illustrating an alternate construction to the arrangement shown in FIG. 2;

FIG. 5 is a view of an oscillatory header rod mechanism mounted in a trough beneath the path of the vehicle so that the bottom side of the vehicle is cleaned;

FIG. 6 is a sectional view along the Line 6—6 of FIG. 5 showing means for mounting one end of the header rod to permit oscillatory movement;

FIG. 7 is a view along the Line 7—7 of FIG. 5 showing details of construction for the mounting of the eccentric throw mechanism for oscilating the header rod;

FIG. 8 is an enlarged detailed view of the duplex header rod mechanism at the lower left of FIG. 2 showing details of construction of the duplex apparatus;

FIG. 9 is a view of the duplex header rod construction shown in FIG. 8 wherein FIG. 9 is the upper end of the duplex header rod showing its construction and mounting for oscillatory movement;

FIG. 12 is a side view of the apparatus shown in FIG. 9 wherein the duplex header rod supports a set of nozzles better shown in FIG. 12;

FIG. 13 is a view similar to FIG. 7 showing the eccentric throw mechanism, this mechanism being mounted on the frame;

FIG. 14 is a sectional view along the Line 14—14 of FIG. 13 showing details of construction of the eccentric throw wherein duplicate sets of header rods are operated thereby;

DETAILED DESCRIPTION OF THE PREFERRED EMBODIMENT

Figure 4:
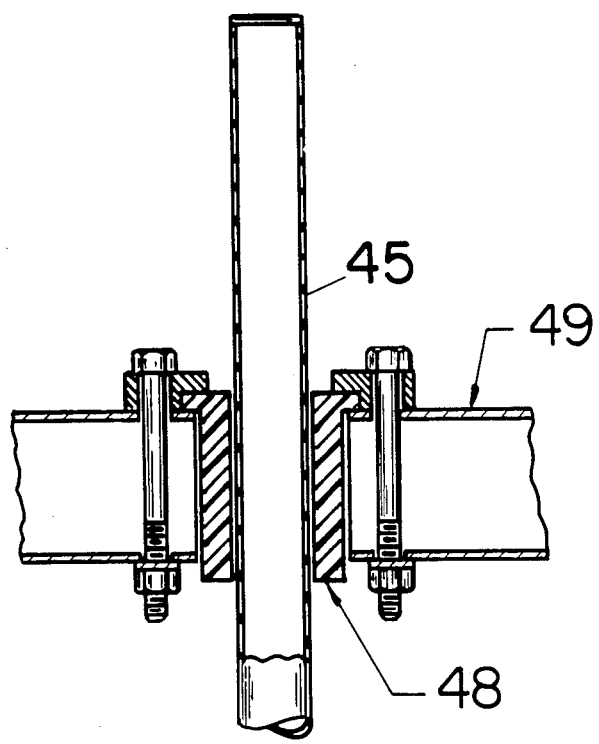
FIG. 4 is a sectional view through the header rod taken along the Line 4—4 of FIG. 3 showing details of construction of the rod and bushing which support the rod for oscillatory movement of the tuned nozzles.

The present apparatus is intended as a vehicle washing apparatus. The term "vehicle" as used hereinafter refers to several types of vehicles including those which operate on rubber tires, typically large buses or trailers. The term "vehicle" also includes those which travel on rails as for example, subway trains, freight haulers such as gondola cars and the like. Typically, they are relatively large, but they can be quite different in size and the apparatus can be adapted to a different scale of application. In FIG. 1, an inverted U-shaped framework is shown whereby cleaning water is applied from both sides and across the top. The vehicle is thus driven through the framework shown in FIG. 1 to be cleaned. Preferably, several sets of the framework shown in FIG. 1 are incorporated along a path for cleaning of the vehicle. For instance, depending on the degree to which the road grime has accumulated, and further dependent on the strength of chemical solution (typically including soaps or detergents) chosen for application to the vehicle, water temperature and water pressure, two or three sets of the equipment shown in FIG. 1 can be used in a typical installation. The number of sets of equipment can be varied so that a suitable cleaning job is achieved in light of the difficulty faced by the cleaning apparatus. One typical cleaning job is removing road grime from large metropolitan area buses which are typically on the road 12 hours a day or more and which accumulate a large amount of grime on a daily basis. The apparatus of FIG. 1 is thus typically installed in multiple sets so that an adequate cleaning job can be achieved in light of the degree of grime accumulation. The apparatus shown in FIG. 1 can therefore be scaled to engulf any size vehicle. As desired, a lower cleaning apparatus can be included typically positioned in a trough spanning the throat of the equipment shown in FIG. 1 and this will be described hereinafter. The apparatus of FIG. 1 is thus installed at multiple locations along the path and is provided with suitable volumes of water at suitable temperatures with different detergents whereby cleaning and final rinse can be accomplished.

In FIG. 1, the numeral 10 identifies the cleaning apparatus. This term will be applied to the equipment shown in FIG. 1, it being understood that it can be supplied in duplicate sets. It incorporates an upstanding frame with an upright left-hand frame member 11 and a parallel right-hand frame member 12. There is a tranverse overhead frame member 13 and a spaced frame member 14 which comprise a support mechanism for the overhead washing equipment to be described. Lengthwise stringers perpendicular to the plane of FIG. 1 can be included to join and connect several sets of the cleaning equipment 10 in series.

Attention is directed to FIG. 2 of the drawings where the upstanding frame member 11 is shown in orthagonal view. The frame member 11 is an upstanding post, box beam or column standing sufficiently tall to clear the vehicle which is driven past it. Ideally, the vehicle is shorter than the post 11 so that the topmost spray nozzle supported by the equipment applies a cleaning pattern to the very top of the vehicle; that is, it cleans the side of the vehicle to the very top of the side.

The frame member 11 is supported by lateral braces 13 and 14 for structural rigidity. A lengthwise stringer 15 extends from the top parallel to the path of the vehicle. A protruding arm 16 supports a proximity detector 17 which detects the presence of the vehicle. This detector monitors the position of the vehicle being cleaned while the control system via a suitable solenoid valve delivers water under pressure from a source. The water is sprayed through tuned nozzles oscillated by the equipment shown in FIG. 2 for cleaning the vehicle. As further shown in FIG. 2, the equipment on the left includes a duplex header rod. The right-hand side of the view shows a single header rod mechanism. The term "duplex" thus refers to two parallel header rods mounted on a common eccentric mechanism, and this is best shown in FIG. 2. This is particularly used at the point where the vehicle first encounters the washing apparatus because greater scrubbing and cleaning from the detergent spray is needed. The vehicle cleaning apparatus described by reference to FIG. 2 includes the duplex equipment. For a description, attention is directed momentarily to FIG. 8 of the drawings.

Figure 11:
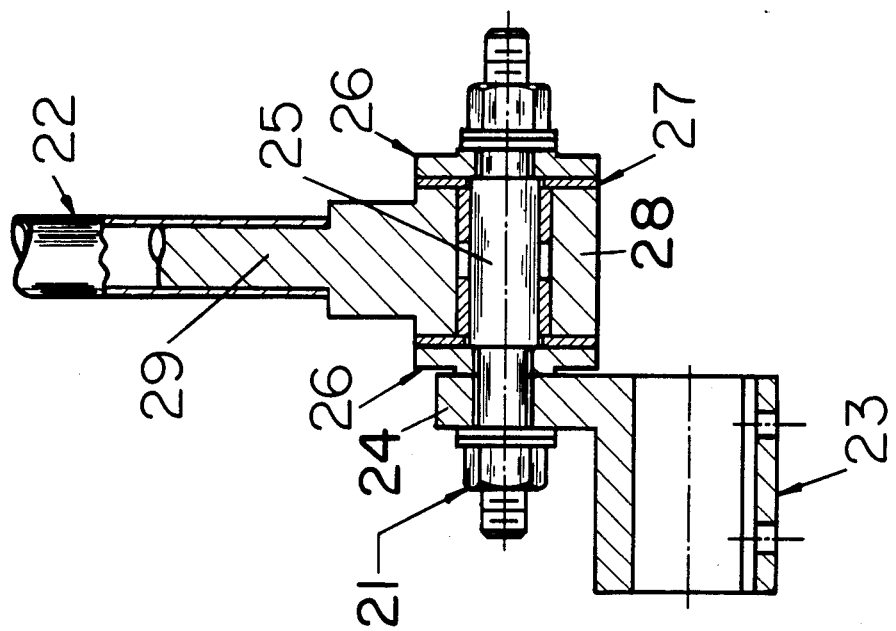
FIG. 11 is a sectional view taken along the Line 11—11 of FIG. 8 wherein the eccentric throw and mounting apparatus at the end of the header rod are shown in greater detail.
Figure 10:
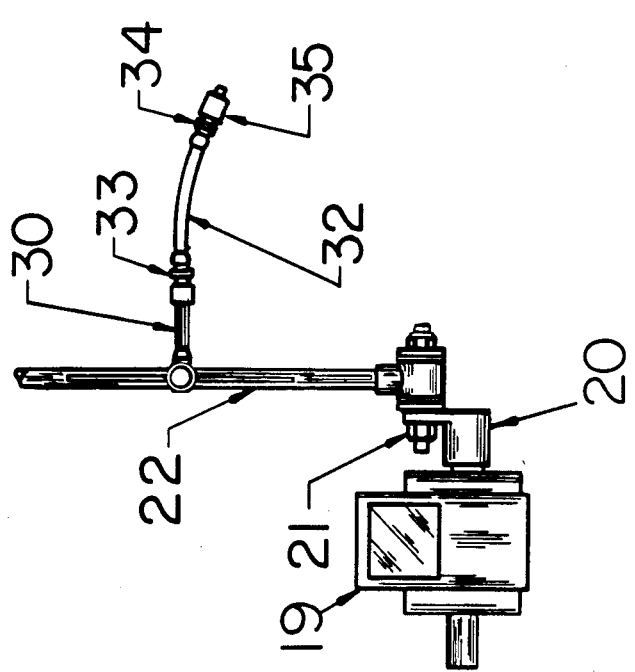
FIG. 10 is a sectional view along the Line 10—10 in FIG. 8 showing details of construction of the eccentric mechanism.

In FIG. 8, the lower end of the duplex construction is shown. In general, it includes an eccentric drive mechanism with a throw. The motion of the drive mechanism excites the tuned nozzles as will be described. This imparts rotary motion which is converted into a controlled nozzle spray geometric pattern by the eccentric throw mechanism at one end of the head while the opposite end is received in a linear bushing thereby permitting oscillatory nozzle excitation movement. In FIG. 8, the numeral 18 identifies an eccentric drive motor. It is connected to a suitable right angle gear box 19 which has a protruding drive shaft at 20. The drive shaft is connected to an eccentric arm which is identified at 21. The arm is able to rotate through a fixed radius at a speed determined by the motor 18. The arm 21 supports an upstanding short header 22. Perhaps this is better seen on viewing FIG. 10 of the drawings. There, the mechanism is better shown so that the rotary excitation pattern of the throw can be understood. In fact, FIG. 11 is an enlarged detailed drawing showing additional details. FIG. 11 therefore depicts a hollow sleeve 23 which is attached by suitable set screws (not shown) to the shaft protruding from the gear box 19. The sleeve 23 is thus affixed to impart rotation to a protruding tab 24. The length of the tab 24 determines the radius of the throw mechanism. The tab 24 receives and supports a mounting bolt 25. The bolt 25 is double ended, suitably receiving nuts and washers in place to fasten thrust washers 26 at opposite ends of the bolt. The thrust washers bear against a rotary bushing 27, this bushing being incorporated to enable a header support plug 28 to be captured on the bolt 25. This is shown in FIG. 11 to include an upstanding plug which stabs into the lower header 22. As appropriate, the members are joined together by means of a transverse pin 29 to fasten the lower header 22 to the eccentrically rotated mechanism shown in FIG. 11.

Returning now to FIG. 10, it will there be noted that one of the tuned nozzles is mounted on a short stub pipe 30. This is included to modify nozzle tip spacing by the length of the pipe 30. The pipe supports the nozzle which is generally identified as 32. The nozzle is constructed of suitable fittings at 33 which join to the stub pipe 30. At the opposite end, there is a fitting 34 and a nozzle head 35 which is drilled with one or more holes which function as water flow orifii for spraying water. The scale factors that relate to the nozzle 32 should be noted. It is preferably formed of resilient material, for example, a hose and is reasonably short. The resilient hose is hollow and bends readily. The fitting 34 and the head 35 have a specified weight. The length of the hose, the relative stiffness of the hose determined by the material of the hose, the weight at the end of the hose, and the water pressure are all factors which enter into control of the nozzle movement. Recall that the nozzle repetitively follows or tracks a controlled and amplified pattern, and is provided with water at relatively high pressure flowing through it. The water pressure tends to stiffen the hose so that it does not hang limply. During use, high pressure water prevents damage to the resilient hose. When the water pressure is high, the hose reacts as a semi-solid member and therefore sets up non-critical bending and flexing whereby the nozzle tip moves in a pattern controlled by these factors and the pattern of movement imparted to it by the mounting mechanism.

An important factor in use is the protection water pressure stiffening provides to the resilient hose. With water at 500 psi or higher, the degree of bending is limited by the water which mechanically reinforces the hose. The hose is made stiffer partially dependent on pressure; in the preferred embodiment, a minimum pressure of about 750 psi is used to thereby stiffen the hose and prevent damage to the hose.

The water pressure and nozzle movement determines a spray pattern for operation of the nozzle. The spray pattern applies water over the surface of the vehicle within the inscribed angle of the spray pattern. As will be understood, the term "nozzle" as used hereinafter refers to the equipment shown in FIG. 10 from the fitting 33 to the tip. Some nozzles are mounted on standoff pipes such as the short pipe 30 shown in FIG. 10 while others are mounted with no pipe as will be described later.

Returning now to FIG. 8 of the drawings, the construction of the duplex header apparatus will be described. The short header 22 serves as a support for a transverse horizontal rod 37. This supports upstanding parallel pipes 38 and 39. The three vertical members joined to the horizontal rod 37 are all braced by suitable corner braces 40. This adds stiffness to the structure. The parallel, upstanding pipes 38 and 39 are identical and differ only in their position. They are symmetrically arranged to the left and right and are balanced. The horizontal rod 37 is hollow and supports a number of nozzles across its length. Thus, it is capped at the end by suitable removable closures plugs 41 and also supports nozzles at 42, there being four such nozzles. The precise number can be varied, and it is preferable that they be evenly spaced so that the spray that is applied to the vehicle from them is evenly distributed over a wide area.

The upstanding pipes 38 and 39 as shown in FIG. 8 have substantial vertical height and are also shown in FIG. 9 at the top end of the equipment. There, they join together at a top header 44 which in turn connects with a vertical rod 45. Again, stiffening of the structure is obtained by corner braces 40 which are preferably identical to those shown in FIG. 8.

Figure 3:
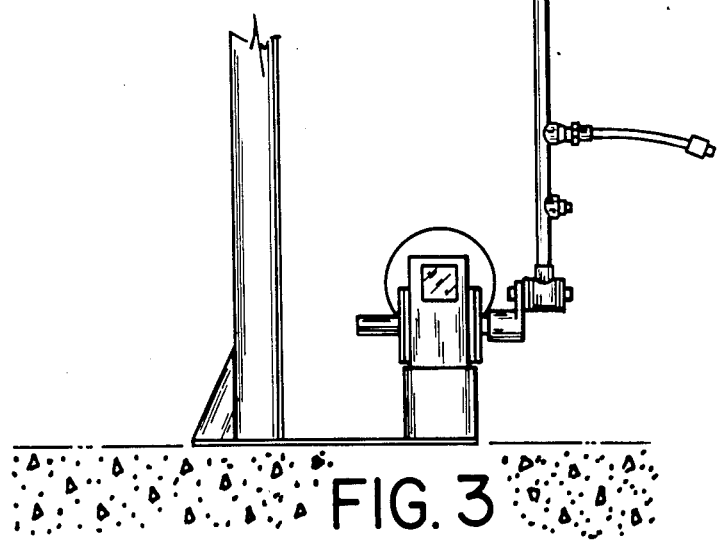
FIG. 3 is a view orthogonal to FIG. 2 and taken along the Line 3—3 showing in side view the header rod which supports a set of nozzles thereon.

A fitting on the backside of the pipe similar to that shown in FIG. 3 is incorporated so that a water hose can be connected to supply water. This fitting is preferably located at the back side of the tee 46. The tee 46 connects to the top header 44 and is able to deliver water through the tee 46 into both the left and right sides of the equipment. That is, water is delivered through a flexible hose connected into the fitting, the water flowing through the top header 44 and to the various nozzles. The fitting delivers water for flow into the header pipes and then to the various nozzles. The upstanding pipes 38 and 39 are braced at various intermediate points by transverse bracing members 47. This defines a relatively stiff structure. At the upper end, the entire structure telescopes because the rod 45 is received in a linear bushing and is able to slide and oscillate around the bushing as a pivot point. Where this is shown in FIGS. 9 and 12, a better understanding of the operation of this aspect can be observed on review of FIG. 4. That will be described in detail in conjunction with FIG. 3.

Returning now to FIG. 2 of the drawings, it will be recalled that a duplex construction is shown on the left while the right apparatus includes only a single header construction. The equipment is identical in the frame and eccentric throw mechanism. It is also identical to the mounting for the rod 45 at the upper end. FIG. 3 is orthogonal to FIG. 2 and shows the single header construction from the side. As is understood, a side view of the duplex header construction of FIG. 2 is similar to that shown in FIG. 3. In FIG. 3, the header rod 31 is shown to support several tuned nozzles, the nozzles heretofore being identified generally at 32 with reference to FIG. 10 of the drawings, and the nozzles shown in FIG. 3 are identical to those shown in FIG. 10. The only difference lies in the short stub pipe 30 which supports the nozzle shown in FIG. 10. Those shown in FIG. 3 omit the short pipe, and the nozzles are thus attached directly to the vertical header rod 31. FIG. 3 also illustrates the appropriate fitting for connection to a supply hose, this fitting being located at the upper end of the header rod 31. Going now to FIG. 4 of the drawings, a self-lubricated linear plastic bushiing 48 is shown. This bushing is loose around the upstanding rod 45 shown in FIG. 4. This permits sliding or telescoping movement.

Assume that the eccentric throw at the bottom of the structure shown in FIG. 3 has a radius of 2.5 inches and thereby oscillates the rod 45 by a stroke of 5 inches. Sliding movement is accommodated at the bushing 48 to permit the rod 45 received therein to slide by this length. The eccentric throw rotates in a circle and hence an angular movement of the shaft is imparted to the linear bushing. If the throw has a maximum excursion of 5 inches at the bottom of the rod, the rod deflects at an angle at the top end by a trignomatric function determined by the stroke (5 inches in this instance) and the length of the rod. Typically, the angle of shaft wobble is relatively small, typically in the range of about 2 degrees. The bushing 48 is sized so that it permits free linear movement. The mounting shaft 49 is thus rotated, it being received on a shaft and bearing assembly to permit it to oscillate or rotate. The bushing 48 is held in place by means of suitable nuts and bolts cooperating with lock tabs in position to secure the bushing 48.

Summarizing the structure as described to this point, the tuned nozzles 32 have been set forth in some detail. The duplex header construction has been described as well as the single header construction shown in FIG. 3. The eccentric throw mechanism at the lower end imparts rotary excitation motion to the lower end of the header arrangement while the upper end is supported in a linear bushing which permits both linear movement and pivotal movement with a limited angular wobble. Moreover, this locates the nozzles 32, typically 4 or 5 vertical locations along the header rod (obviously more in the duplex arrangement) so that synchronous overlapping spray patterns can be accomplished. Returning now to FIG. 2 of the drawings, it will there be seen that the duplex header construction on the left is thus similar to the single header construction on the right; the two sets of equipment are spaced apart so that they can apply individual spray patterns as desired. For instance, for a vehicle moving from left to right as viewed in FIG. 2, hot water with strong detergent (or rinse water) can be applied by the equipment. A cooler rinse water can be applied from the equipment. Generally, washing and rinsing are synchronized with specific dwell times for each cycle. Also, most installations include similar sets of equipment with the first set applying wash water with a detergent and the second set of equipment applies the rinse. A short interval after detergent application permits the detergent to penetrate the grime and road film. Thereafter, the rinse with an ample flow will remove grime and detergent.

FIG. 2 shows in sectional view the overhead equipment. This is better seen and understood by returning again to FIG. 1 where the overhead frame members 13 and 14 are included. These frame members span the equipment to support the apparatus which accomplishes overhead washing. The frame member 14 is constructed in duplicate. Attention is therefore directed to FIG. 13 of the drawings where there are two frame members 14 shown, and they support by suitable brackets 50 a gear box 51 and drive motor 52. The equipment shown in FIG. 13 is similar to the equipment shown in FIG. 8 comprising the eccentric throw mechanism. The only difference is the mounting and that is accomplished by the brackets 50 just described. Whatever the case, the gear box powers a shaft which extends from the gear box and engages a sleeve 53, the sleeve being connected with a suitable eccentric arm 54. The arm 54 is similar to the arm 24 shown in FIG. 11. The bolt 55 passing through the arm 55 is similar to the bolt 25 shown in FIG. 11. The bolt 55 is preferably longer so that it is able to support two rods for eccentric motion. That is, the bolt 55 is held into position between suitable nuts and washers at the ends; spacer washers are included at 56 to thereby permit the rod end support structures shown in FIG. 11 to be duplicated. As viewed in FIG. 13, the rods which the bolt 55 supports are 180 degrees opposite one another; that is, they extend in opposite directions. This is better seen on viewing FIG. 14, this view depicting one header rod 59 extending to the left and the other header rod 58 extending to the right. As otherwise shown, the apparatus in FIG. 14 is similar to the apparatus shown in FIG. 11 and is provided in duplicate.

Returning now to FIG. 1 of the drawings, it will be observed that the overhead header rod 58 and 59 are driven by the common drive mechanism shown in FIGS. 13 and 14 to move through the common oscillatory patterns. FIG. 1 shows that the oscillatory header rod 58 is spaced from the frame member 14 by a larger distance while the header rod 59 is closer to the frame member 14. That is, in FIG. 14, the header rod 58 is the lower of the two. These two header rods thus move in identical patterns and they are phased by the common drive mechanism. They both support nozzles, but the preferred arrangement locates the nozzles from the header rod 59 on short stub pipes 30. This positions the very tips of all tuned nozzles at a common elevation. Thus, if the header rods 58 and 59 are three inches offset, the short pipes 30 compensate for this three inch measure to thereby position the spray tips at a common elevation.

It will be observed further that the nozzles deployed along the vertical walls of the vehicle are more numerous at the bottom. This is particularly so as shown in FIG. 8 where there are four on the horizontal rod 37. This is not needed to clean the top of the vehicle because ordinarily that is not sufficiently dirty as to require extra treatment. Moreover, FIG. 3 depicts in a representative deployment four elevations for nozzles to spray the sides of the vehicle. The header rod 58 supports only two nozzles and they more aptly direct cleaning water over the entire roof of the vehicle. The two header rods 58 and 59 together provide four nozzles which sweeps the full width of the vehicle. This is a scale factor and can be varied. Therefore, the representative deployment of header rods 58 and 59 is particularly helpful for cleaning the top of the vehicle and can be modified depending on the width of the vehicle and the shape of the vehicle. If the vehicle is an open gondola car or a trailer, the overhead equipment must use a header as shown or a modified header design. Generally, spacing between the header rods 58 and 59 and vehicle surface determines header configuration and length of nozzle mounting pipes.

For the moment, attention is direction to FIGS. 2 and 2a. Both show the same apparatus and are identical in this regard. FIG. 2a incorporates an optional transverse bottom cleaning apparatus. Both drawings thus are similar in provision of equipment for cleaning the side and the overhead of the vehicle. The bottom side is another facet of the device. FIG. 2a incorporates transverse equipment across the path of the vehicle for cleaning the bottom side. For instance, certain vehicles are constructed with a bottom cowling which becomes heavily coated with road grime. It also collects salt where salt is used to thaw and melt ice. Whatever the case, FIG. 5 is a sectional cut line across FIG. 2a to show details of the bottom cleaning apparatus. In FIG. 5 of the drawings, a transverse trough or ground located ditch or cavity is shown, the trough being identified by the numeral 60. The trough 60 slopes downwardly for drainage of spray through a drain (not shown). The trough positions a bottom cleaning apparatus which is constructed with the same oscillatory header supported by an eccentric throw at one end and received by the linear bushing at the opposite end. Thus, the sectional view of FIG. 6 depicts a mounting bracket 61 which supports upstanding mounting plates 62 for receiving the sliding bushing 63. The bushing 63 is similar to that shown in FIG. 4. A linear motion shaft 64 is shown in FIG. 5 to pass through the bushing for sliding movement. Angular deflection is also permitted by this device. The shaft 64 is thus similar to the header construction shown in FIG. 2 and is preferably a single header or a duplex. Duplex apparatus can be used as required. The shaft 64 supports a number of tuned nozzles 32. They are located on the shaft 64 to point upwardly to spray the bottom side of the vehicle.

The shaft 64 connects with an identical eccentric throw mechanism at the right of FIG. 5. Directing attention momentarily to FIG. 7 of the drawings, mounting brackets 65 are incorporated to support the eccentric throw mechanism at a suitable height in the trough 60. The trough is modified with steps at 66 to locate the eccentric throw mechanism above the bottom of the trough. Waste water typically runs in the trough and therefore it is desireable to locate the reciprocating equipment above the level of the waste water. The arrangement of FIG. 5 thus shows three nozzles which are positioned and located to provide total, overlapping cleaning along the bottom center of the vehicle. The total width of the spray pattern applied by the amplification of the three tuned nozzles and by the spacing of the nozzles from one another and excitation mode and the spacing of the nozzles from the vehicle surface thereabove is a scale factor which again be modified by the incorporation of more or fewer nozzles, wider spacing and the like. The cleaning width depends on the degree of road film and grime to be cleaned and other factors which can be determined at the time of design of the equipment.

In summary, the equipment shown in FIGS. 5, 6 and 7 cleans the bottom side of the vehicle and is similar to the equipment for cleaning the sides and top. It is oriented differently; that is, it is located to clean the bottom of the vehicle. A single set of equipment is shown for cleaning the bottom, but it should be kept in mind that duplicate sets of equipment can be used, as for instance, driving two rods from a single eccentric throw mechanism as was described for the transverse top cleaning apparatus in FIGS. 1, 13 and 14.

NOZZLE DESCRIPTION AND OPERATION

Figure 15:
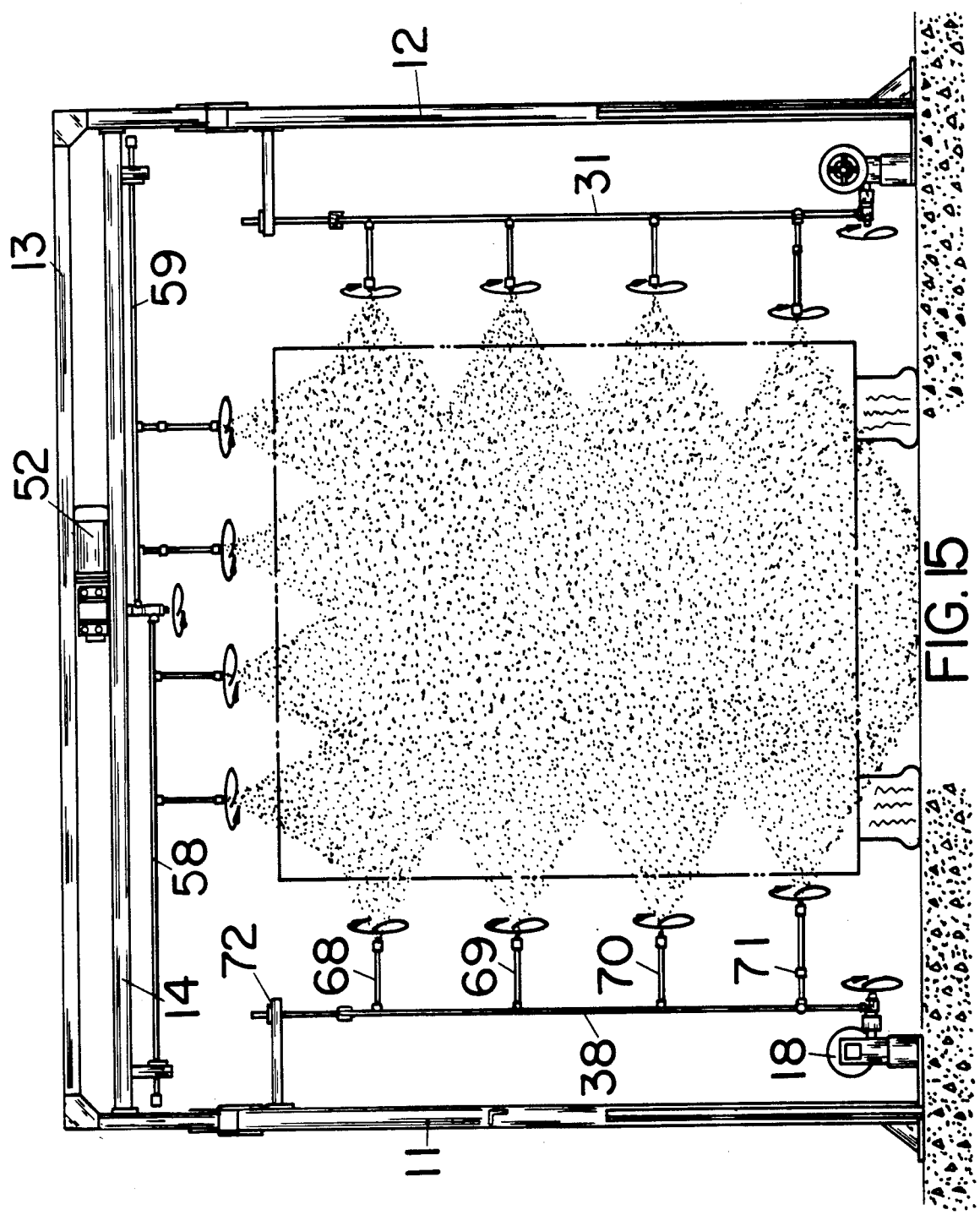
FIG. 15 is a view showing the water spray distribution pattern from several sets of nozzles being arranged on the left, on the right, and above whereby a vehicle driven through the apparatus is cleaned.
Figure 16:
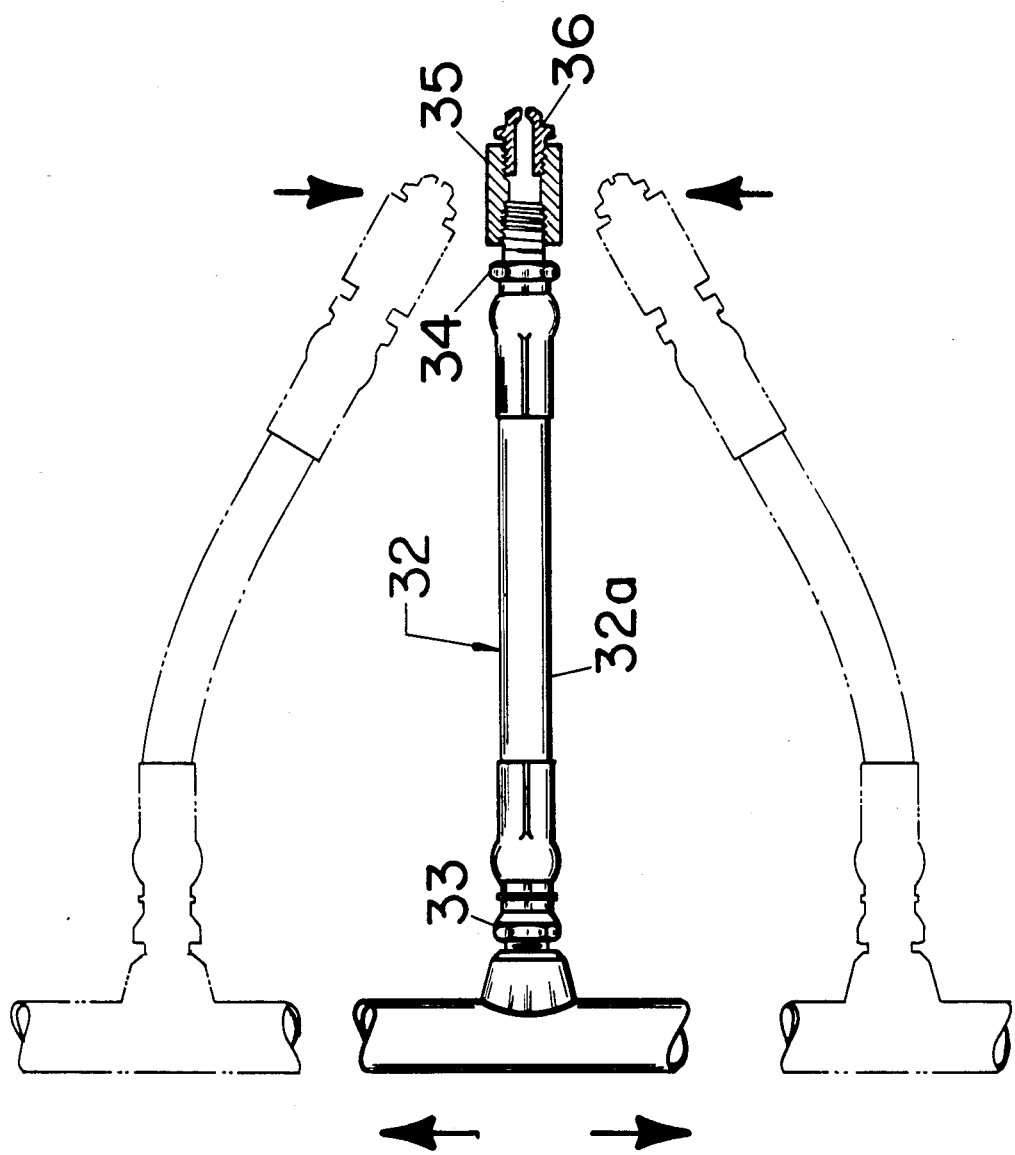
FIG. 16 is a view in full line of a nozzle and shows in dotted line positions of the nozzle during vibration.

Attention is now directed to FIGS. 15 and 16 to be considered jointly. FIG. 15 shows the overall pattern which is achieved by this equipment. Keep in view that the bottom located cleaning spray nozzles have been omitted for sake of clarity. They apply a spray pattern which is very similar to that applied from the sides and top. Briefly, FIG. 15 shows a pattern whereby a vehicle represented in dotted line is driven through or past the spray equipment to be cleaned. It should be further kept in view that, through the use of the duplex header construction, the number of tuned nozzles acting at the bottom of the side is increased. Referring specifically to FIG. 15, the first cleaning nozzle is identified by the numeral 68 while the cleaning nozzle therebelow is identified at 69. A lower cleaning nozzle is illustrated at 70 while the cleaning nozzle at 71 is the lowermost cleaning nozzle. The wobble pattern of each nozzle is proportionate to the spacing of the nozzles at the four cleaning stations from the pivot point. The pivot point is the bushing shown in FIG. 4 and for ease of description is located at 72 in FIG. 15. Thus, trignometric relationships exist whereby the wobble pattern varies along the rod. This causes the nozzle 68 to spray a specified surface area. Assume that this surface area has a height of 12 inches. The tuned nozzle 69 wobbles further and hence sprays a wider area. The pattern is similar but wider because it is closer to the excitation drive mechanism. It may therefore clean a wider vertical swath in comparison with the vertical swath from the nozzle 68. The nozzle 70 undergoes longer vertical excursion and hence cleans over an area of greater height. Again this results from the fact that it undergoes a different excursion path because it is closer to the eccentric throw.

The nozzle 71 would ordinarily clean a longer vertical swath yet; the swath is longer because the nozzle 71 is closer yet to the eccentric throw. However, it is preferably mounted on a short stub pipe; this stub pipe positions the nozzle tip closer to the vehicle and reduces angular deflection to effectively clean wheels. The nozzle tip creates a spray pattern which cannot diverge as much as those above because the nozzle 71 nozzle 71 is closer to the vehicle. This positions the nozzle tip closer to the vehicle and hence the spray strikes with greater kinetic energy and is better able to clean the grime. This is desirable because a greater degree of difficulty of cleaning is encountered at the lower side and the wheel area of the vehicle. Moreover, duplex equipment is preferably used to accomplish the cleaning. The water is preferably heated to an elevated temperature and is provided with a detergent. It is delivered at relatively high pressure (typically above 1,250 psi) and is applied through the nozzles at the four elevations. Because duplex equipment is preferred for the cleaning, there are two adjacent nozzles at 68, 69 and 70. However, there are preferably four nozzles at 71. The lowermost nozzles are increased in number and also are much closer to provide a more vigorous cleaning action at this elevation. This bias in favor of more vigorous cleaning at the lower part of the vehicle helps remove the increased thickness of road grime at wheel height on the vehicle.

In this examplary description, the cleaning action of multiple nozzles is synchronously driven. In operation, the nozzles are driven by a common excitation drive mechanism and hence all nozzles having the common drive move in synchronized motion. Viewed from the side, the nozzles commonly driven sweep up and together and deflect downwardly together. Synchronous operation aids in overlapping the areas cleaned by adjacent nozzles.

Figure 17:
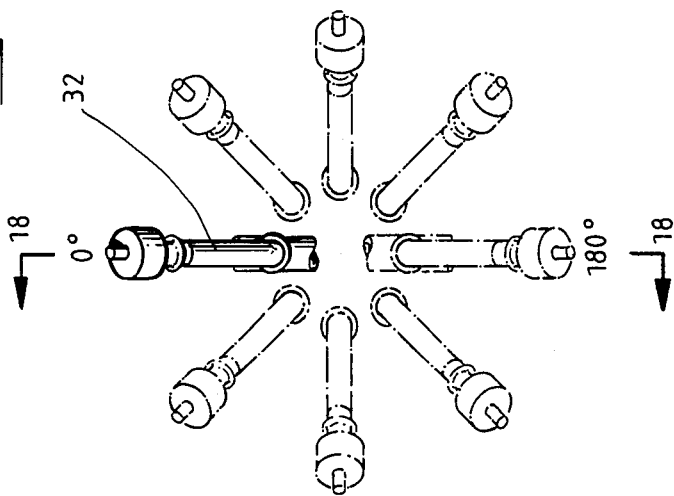
FIG. 17 is a partial front elevational view of one of the nozzles shown in substantially planar movement upon excitation by the drive source. The figure illustrates one rotating nozzle at a 0° orientation, the dotted line representations of this nozzle showing the movement of the nozzle through alternate 45° increments of planar rotation.
Figure 18:
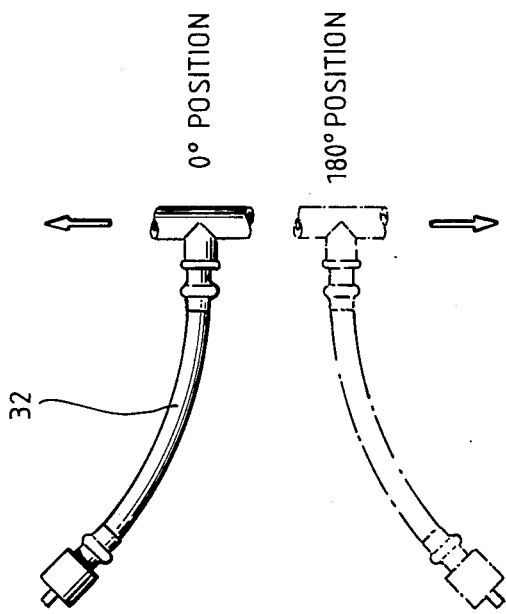
FIG. 18 is a side sectional view of the rotating nozzle apparatus as taken from a plane 18—18 drawn through FIG. 17 as shown. The figure illustrates one nozzle in an orientation of 0°, the dotted line representation of the nozzle indicating an alternate 180° orientation.

When permutated by the drive mechanism earlier described, each nozzle (when viewed from a side section) undergoes a set displacement from the horizontal, but at all times the excitation of the nozzle tip describes a substantially planar orbital movement parallel to the surface of the vehicle, as shown in FIG. 17. As such, the water pattern described produces a maximum impact efficiency on the surface of the vehicle while eliminating cross spray interference with other nozzle spray patterns. The orbital motion may be generally elliptical or generally circular, as shown in FIG. 18.

The hose will achieve a synchronous pattern of movement when the centrifugal force is greater than the summation of all the water reaction forces. These forces are due primarily to the hydraulic inertia of the water leaving the nozzle.

The synchronized and geometric character of the nozzle's orbit as produced by the common drive mechanism is a result of the selective design of the following and other components: (1) Hose flexibility, (2) Length of the free hose member, (3) Pressure of the cleaning medium, (4) Frequency/amplitude of the excitation source, (5) Weight of the nozzle tip, (6) Volume of medium through the nozzle, (7) Symmetrical or round shape of the nozzle opening, and (8) Capability of the hose of becoming stiff when there is pressurization but no excitation.

Referring to FIG. 16, as an example of one exemplary hose configuration suitable for obtaining nozzle tip motion substantially in a single plane, a flexible three-eighths inch inside diameter reinforced rubber composition hose 32a, obtained from Aeroquip, Model 2583, size C, may be used, cut to a free rubber length of 5.25 inches. To one end of the hose is attached a one-quarter inch inside diameter F-4 nozzle fitting 34, Aeroquip Model 4412-4-4F, with a three-eighths inch inside diameter F-6 nipple fitting 33, Aeroquip Model 4412-6-6F, attached to the opposite end. To the nozzle fitting 34 is attached a nozzle head or weight member 35, a one-quarter inch coupling. To the free end of this nozzle 35 head or weight member is attached a nozzle tip 36, a one-quarter inch meg—1520 nozzle made by Spraying Systems, Wheaton, Ill. The nozzle inlet pressure may be set at 1000-1200 psi. The hose is excited by the drive means to achieve a fixed end rotation of 175 rpm to move in a circle having a 5-inch diameter. The nozzle tip 36 will then swing in a generally circular pattern having a diameter of about 8 to 9 inches.

The nozzle head or weight 35 is set at 10 ounces. The volume flow rate is 7.5 to 10 gallons per minute. With this arrangement, a regular, periodic, synchronized planar nozzle pattern is achieved.

Each nozzle (when water filled) is a relatively stiff member having a resonant frequency for vibration on excitation. The frequency is in part dependent on physical parameters including the water pressure. The pressure is preferably high, such 750 psi or more. In the preferred form, the nozzles shown in FIG. 16 are tuned by modification of hole diameter and weight of the tip. The tip is preferably formed with a tip having a tubular sleeve on it. The sleeve is varied in diameter and length to vary total tip weight and therefore vary the resonant or tuned frequency. The tips are therefore adjustable to accomplish a different resonant frequency and to modify the angle of excursion and angle of water distribution.

Each nozzle is preferably identical (for reduced inventory and commonality of parts) in all regards other than tip orifice and tip weight. Thus, the hose is duplicated and the fittings on the hose are identical. The orifice can be conveniently formed of an insert placed in the tip assembly or can be a hole drilled to size. Tip orifice size is then easily changed by simply exchanging inserts, or drilling a hole to size in a blank tip component. For the tip weight, a set of graduated weight sleeves is conveniently used to vary the weight.

The nozzles which clean the top of the vehicle presumably are exposed to a common degree of grime and hence they provide relatively uniform spray patterns. There is no need to provide duplex equipment for cleaning the top in ordinary circumstances.

Attention is now directed to FIG. 16 of the drawings. There, an individual nozzle is shown in full line. The dotted line representations are achieved dynamically during the excursion of the nozzle. Thus, FIG. 16 shows in representative fashion in dotted line the position of the nozzle as it bends during excitation. It should be kept in view that the header does not merely reciprocate but it also undergoes a small angular excursion sliding in the linear bushing functioning as a pivot point. This causes the tip to wobble in a pattern which is a function of the reciprocation and angular movement. It is rather difficult to describe the motion of the tip of the tuned nozzle because it is somewhat complex and is dependant on the variables mentioned above, and to this end, is best simply described as being a synchronous sweeping spray pattern having an included angle dependant on the scale factors describing the operation of the tuned nozzle 32. In sum, FIG. 16 represents in dotted line similar sweeping action of the tuned nozzle whereby the spray pattern is directed over a specified swath at the vehicle to inscribe a particular cleaning action. That angle can be changed and modified to increase or decrease the cleaning swath on the vehicle.

While the foregoing is directed to the preferred embodiment, the scope is determined by the claims which follow.

What is claimed is:

1. Cleaning apparatus for washing a dirty object moving therepast comprising:

(a) a water receiving pipe having at least two fittings;

(b) supply means connected to said pipe for delivering water thereto;

(c) means connected to said pipe to repetitively power said pipe along a patterned path;

(d) separate nozzle means connected to each of said fittings for receiving water flow therefrom;

(e) each of said nozzle means including an end located water flow opening for delivering a water stream therefrom, means for causing said opening when driven by said power means to describe a substantially planar pattern of orbital motion relative to the surface of the vehicle;

(f) each of said nozzle means further including an elongate hollow resilient member having two ends wherein one end thereof is connected to each of said fittings and the other end thereof is connected to a weighted tip, and said resilient member has increased resistance to bending on being filled with water above a specified pressure;

(g) said weighted tip closing said resilient member and having said water flow opening therein for flowing water during movement of said weighted tip in response to movement by said power means;

(h) wherein said power means drives each of said nozzle means cooperative with said weighted tip to direct water flowing from said nozzle means in the form of water streams sweeping over an area washing the dirty object;

(i) wherein each of said water streams sweeps synchronously with another of said water streams to define first and second water sweeping areas of the dirty object; and (j) wherein said nozzle means direct the water streams to the first and second water sweeping areas with overlap and without water stream interference.

2. The apparatus of claim 1 including an end located tip fitting sealingly joined to said resilient member and further having means for supporting a tip located weight means for varying the weight of said weighted tip.

3. The apparatus of claim 1 including a stub connective pipe between said fittings and said resilient member, and protruding from a water receiving pipe.

4. The apparatus of claim 1 wherein said power means drives said pipe and said nozzle means to a common path including oscillation of said pipe and swinging of said nozzle means accompanied by bending of said resilient members.

5. The apparatus of claim 4 wherein said nozzle means all commonly move to provide synchronized water sprays.

6. The apparatus of claim 1 wherein said power means comprises:
(a) rotative, motorized, drive means for oscillating said pipe;
(b) an elongate header means connected at one end to said drive means;
(c) said header means having a second end supported by a header support means; and
(d) said header means incorporating said pipe for delivering water to said nozzle means and also including a water inlet means connected to said pipe from said water supply means.

7. The apparatus of claim 6 wherein:
(a) said drive means comprises an eccentric rotated arm;
(b) said header means is pivotally connected to said rotated arm;
(c) said support means comprises a linear bushing;
(d) said header means has an elongate portion linearly slidingly received in said bushing; and
(e) said drive means imparts rotative motion to said header means causing movement in two dimensions, and said nozzle means carried thereby are repetitively drive to vibrate in a pattern and at a frequency determined by operation of said drive means.

8. The apparatus of claim 7 wherein said header means comprises a vertically positioned pipe having a plurality of said fittings therealong to connect to a plurality of nozzle means through spaced stub pipes thereon.

9. The apparatus of claim 7 wherein said header means comprises two vertically positioned pipes having a plurality of said fittings therealong.

10. The apparatus of claim 7 wherein said header means comprises a horizontal pipe supporting a plurality of fitting means therealong to connect to a like plurality of nozzle means.

11. The apparatus of claim 7 wherein said header means supports a first and a second fitting means, each connected to a nozzle means therefor, and wherein said nozzle means are spaced to spray water in a pattern covering specified areas.

12. The apparatus of claim 7 wherein said header means is a frame of water conductive pipes joined together and having bracing means supporting said pipes as a rigid structure.

13. The apparatus of claim 7 wherein said header means has a position determined by a supportive framework for said drive means and said linear bushing.

14. Vehicle washing apparatus comprising:
(a) water spray means comprising:
(1) a plurality of water spray nozzles arranged in spaced, overlapping vertical deployment;
(2) drive means for repetitively exciting said nozzles in a repetitive synchronous spray patttern without spray interference; and
(b) each of said water spray nozzles including a weighted nozzle means for causing said nozzle, upon excitation by the drive means, to describe a uniform and substantially planar pattern of orbital movement relative to the surface of the vehicle.

15. The apparatus of claim 14 wherein:
(a) said first water spray means includes;
(1) two separate sets of nozzles arranged to spray different portions of a vehicle;
(2) said separate sets of nozzles cooperatively supported by a support structure adjacent to the path of the vehicle;
(b) said drive means providing repetitive excitation to said two sets of nozzles; and
(c) frame means supporting said two sets of nozzles adjacent to the path of the vehicle.

16. The apparatus of claim 14 including:
(a) multiple sets of said water spray means being deployed with left and right sets thereof adopted to spray water on opposite sides of the vehicle, and a third set across the path of the vehicle to apply spray directed at right angles to said right and left sides of the vehicle; and
(b) similar sets of water spray means connected to a supply of rinse water to rinse the vehicle on additional movement along the path.

* * * * *